June 22, 1926.
J. W. PUTERBAUGH
LAWN SPRINKLER
Filed August 23, 1922
1,589,861
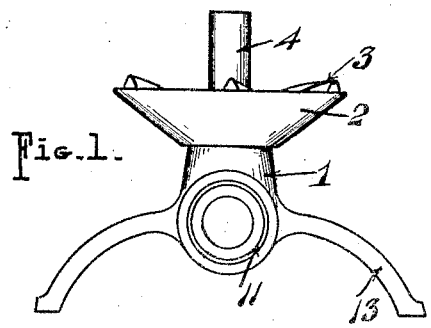
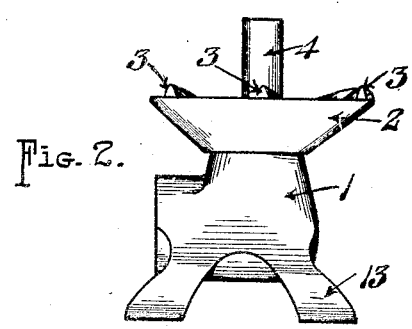
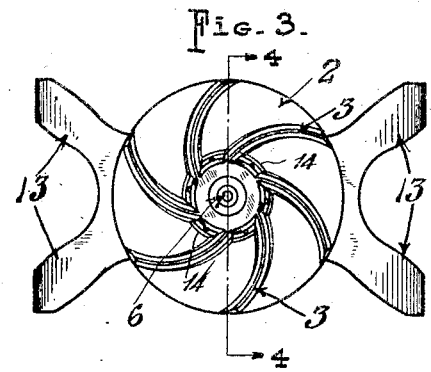
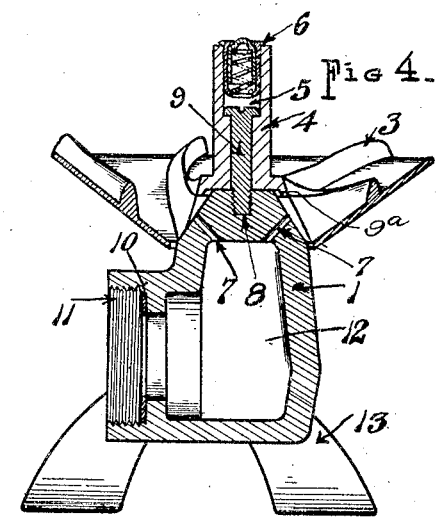
INVENTOR
Jack W. Puterbaugh
BY Allen & Allen
ATTORNEYS Patented June 22, 1926.

1,589,861

UNITED STATES PATENT OFFICE.

JACK W. PUTERBAUGH, OF CINCINNATI, OHIO.

LAWN SPRINKLER.

Application filed August 23, 1922. Serial No. 583,815.

My invention relates to lawn sprinklers of the type in which a rotary member is employed driven by the force of the water from a garden hose to throw a fine spray of water to cover a wide circular space.

My object is to provide a construction in which the durability, efficiency, simplicity and cheapness of construction may be very greatly increased by that certain novel arrangement and combination of parts to be hereinafter particularly pointed out and claimed.

In the drawing:

Figure 1 is a front elevation.

Figure 2 is a side elevation.

Figure 3 is a top plan view, and

Figure 4 is a vertical section taken on the lines 4—4 of Figure 3 of the complete sprinkler embodying my invention.

The rotary member is mounted on a hollow L-shaped member 1, provided with legs 13 to hold the body in an upright position.

Mounted on this body portion is a concave disk 2 provided with spirally curved ribs 3, 3, on the upper or concave side of the disk. The disk or rotor is formed with an elongated hub 4 projecting vertically and the disk is mounted to rotate freely on the spindle 9, which passes down through the elongated hub and is screw-threaded at its lower end to screw into the threaded recess 8 in the body 1, to hold the concave disk 2 in place, while permitting it to revolve around the cone-shaped boss on the body member. The lower side of the hub extends as an annular apron 9ᵃ to protect the spindle from the water spray. A recess 5 is formed in the upper end of the hub 4 to receive an oil cup 6 for oiling the hub bearing. This I believe is an unusual provision for this type of lawn sprinkler.

Also the long hub bearing for the concave disk balances and stabilizes the device and enables it to turn under very light water pressure.

A plurality of ports 7 are formed through the cone-shaped boss of the body which direct the water from the chamber 12 in the body upwardly and outwardly against the inner end of the spirally shaped ribs 3, 3, the rotor having openings 14 between the ribs to allow for the passage of the water.

The body portion 1 is threaded at 11 for connection to a suitable hose coupling and at the base of the threaded portion is a space 10 for a suitable gasket or packing.

The operation of the device will be clear from the foregoing description.

The water under hydrant pressure passes diagonally outward through the ports 7, and as it strikes the ribs, it communicates pressure to rotate the disk, the water is broken up into drops and as the water reaches the extreme end of the ribs, and is thrown off, the jet comes in contact with the next rib under the rotation of the disk.

Having thus described my invention, what I claim as new and desire to secure by Letters Patent, is:—

1. In a lawn sprinkler, the combination with a hose coupling having a vertically disposed conical boss, of a concave rotary member curved upwardly with internal spiral ribs mounted on the conical boss, said conical boss having a plurality of outwardly inclined discharge ports, said ports of sufficiently reduced size to greatly increase the velocity of water passing through the sprinkler and so directed as to discharge the water against the spiral ribs upwardly and the rotary member provided with an elongated vertically disposed hub with a central spindle upon which the hub rotates secured to the center of the top of the conical boss, and said central spindle provided with a shoulder for a bearing against upward thrust of the rotary member.

2. In a lawn sprinkler, the combination with a hose coupling having a vertically disposed conical boss, of a concave rotary member with internal spiral ribs mounted on the conical boss, said conical boss having a plurality of outwardly inclined discharge ports, said ports of sufficiently reduced size to greatly increase the velocity of water passing through the sprinkler and so directed as to discharge the water against the spiral ribs upwardly and the rotary member provided with an elongated vertically disposed hub with a central spindle upon which the hub rotates secured to the center of the top of the conical boss, and said central spindle provided with a shoulder for a bearing against upward thrust of the rotary member, and an oil cup mounted on the rotary member with a discharge port adjacent the shoulder on the spindle and the base of the hub disposed as an annular apron to prevent water being sprayed into the lubricated spindle.

3. A rotor for a sprinkler comprising spirally inclined webs with a hub adapted to provide a vertical mounting for the webs, and the webs having bases extending as a continuous concave annular plate integrally formed with the webs, and the central portion of the annular concave plate extending below the hub, and apertures in the rotor to admit a plurality of high velocity sprays against the webs.

4. A rotor for a sprinkler comprising spirally inclined webs with a hub adapted to provide a vertical mounting for the webs, and the webs being integrally formed with an annular plate extending about the bases of the webs, the hub horizontally extended as an apron to protect the vertical mounting from water and the annular plate extended at its central portions beyond the horizontal alignment of the apron, and apertures in the rotor to admit vertically inclined sprays of water against the webs.

5. A rotor for a sprinkler comprising spirally inclined webs with a hub adapted to provide a vertical mounting for the webs, and the webs being integrally formed with an annular plate extending about the bases of the webs, the hub horizontally extended as an apron to protect the vertical mounting from water and the annular plate extended at its central portions beyond the horizontal alignment of the apron, and apertures in the rotor to admit vertically inclined sprays of water against the webs, and lubricating means for the vertically mounted hub disposed apart from the path of the sprays.

JACK W. PUTERBAUGH.